US007835510B2

(12) United States Patent
Akachi

(10) Patent No.: US 7,835,510 B2
(45) Date of Patent: Nov. 16, 2010

(54) CONFERENCE SYSTEM AND TERMINAL APPARATUS

(75) Inventor: Masateru Akachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1258 days.

(21) Appl. No.: 11/399,460

(22) Filed: Apr. 7, 2006

(65) Prior Publication Data
US 2006/0235851 A1  Oct. 19, 2006

(30) Foreign Application Priority Data
Apr. 18, 2005  (JP)  ............... 2005-119704

(51) Int. Cl.
 H04M 3/42  (2006.01)
(52) U.S. Cl. .................. 379/202.01; 709/204; 715/753
(58) Field of Classification Search ............ 379/202.01; 709/204; 715/753
See application file for complete search history.

(56) References Cited
FOREIGN PATENT DOCUMENTS

| JP | 7-64905 | 3/1995 |
|---|---|---|
| JP | 08-163422 A | 6/1996 |
| JP | 09-046668 A | 2/1997 |
| JP | 09-233453 A | 9/1997 |
| JP | 2003-158576 A | 5/2003 |
| JP | 2004-248145 | 9/2004 |
| JP | 2006-238386 A | 9/2006 |

*Primary Examiner*—Quynh H Nguyen
(74) *Attorney, Agent, or Firm*—Oblon, Spivak, McClelland, Maier & Neustadt, L.L.P.

(57) ABSTRACT

The conference system includes a plurality of terminal apparatuses and a conference management apparatus. The terminal apparatus has an access privilege granting unit, a permission information storage device, and an access privilege setting unit. The conference management apparatus has an access control information updating unit and an access restriction management unit. The access privilege granting unit generates permission information, and send the permission information to a target terminal apparatus. Upon receiving the permission information, the access privilege setting unit causes the permission information to be stored in the permission information storage device, and also sends the permission information to the conference management apparatus. Then, the access control information updating unit updates access control information according to the permission information. The access restriction management unit performs access restriction to system resources based on the updated access control information.

8 Claims, 7 Drawing Sheets

FIG. 5

| TYPE 200a | ITEM 200b | SETTING 200c |
|---|---|---|
| CONFERENCE (ID = XXXXX) | SENDING VIDEO | Y |
| | RECEIVING VIDEO | Y |
| | SENDING AUDIO | Y |
| | RECEIVING AUDIO | Y |
| | INVITING OTHER PARTICIPANTS | N |
| CONFERENCE GROUP SHARED FILES | READING | Y |
| | UPDATING | N |
| | ADDING FILES | N |
| GROUP 1 SHARED FILES | READING | Y |
| | UPDATING | N |
| | ADDING FILES | Y |
| ⋮ | | |

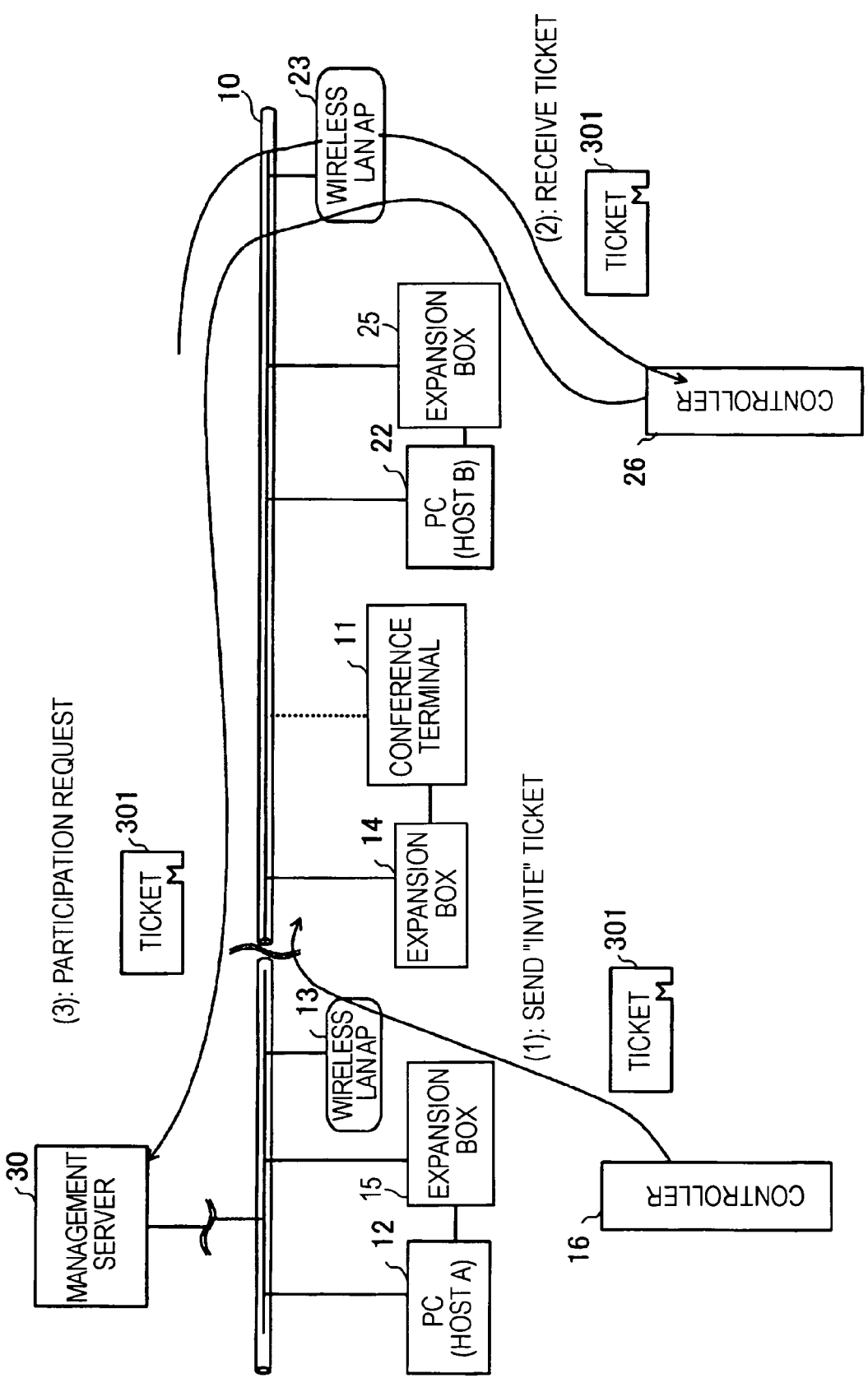

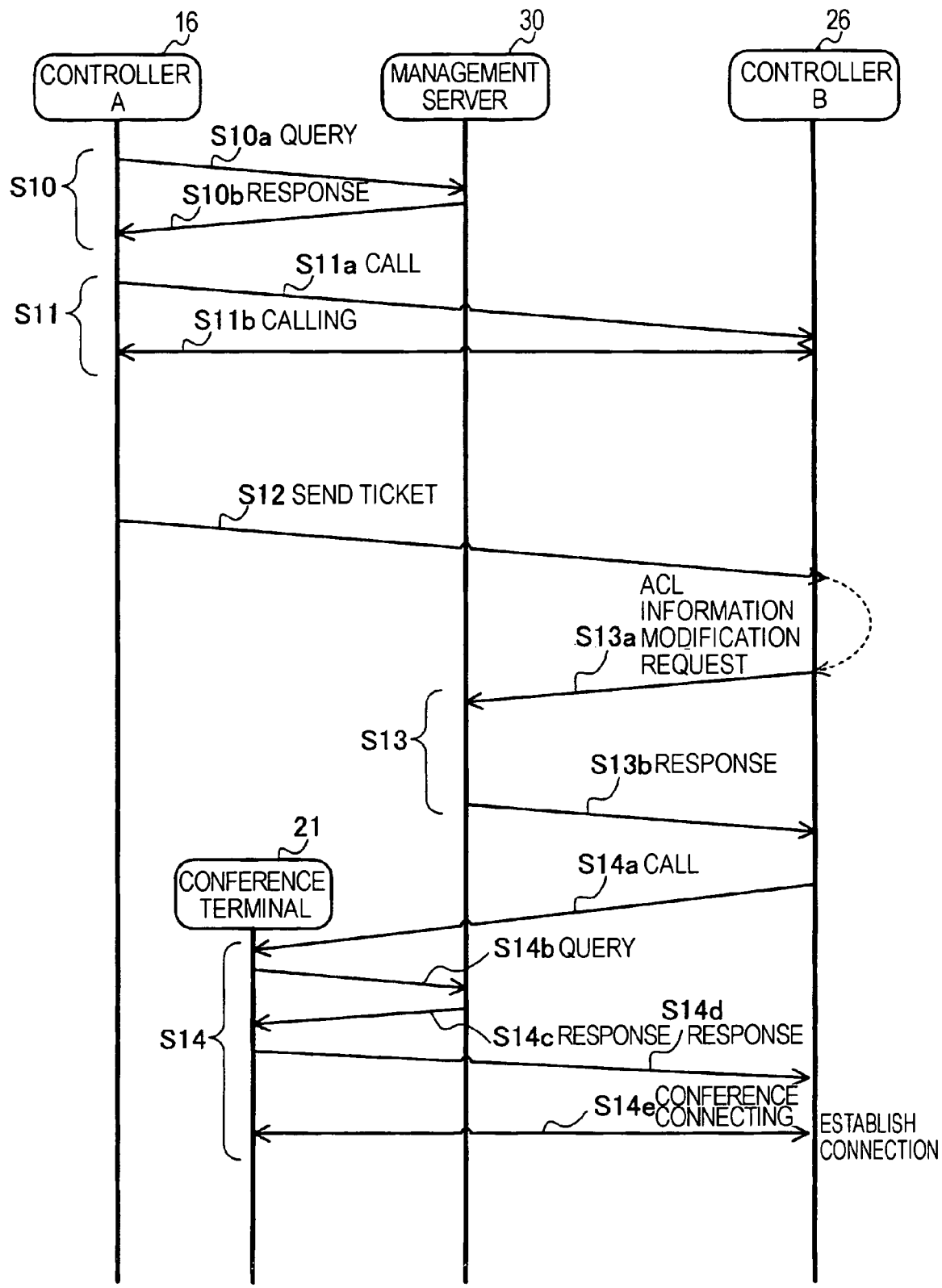

CONFERENCE SYSTEM AND TERMINAL APPARATUS

CROSS REFERENCES TO RELATED APPLICATIONS

The present invention contains subject matter related to Japanese Patent Application JP 2005-119704 filed in the Japanese Patent Office on Apr. 18, 2005, the entire contents of which are incorporated herein by reference.

BACKGROUND OF THE INVENTION

1. Field of the Invention

The present invention relates to conference systems and terminal apparatuses for the same. More particularly, the present invention relates to a conference system in which communication data including audio information generated at a conference is exchanged between terminal apparatuses as well as access restrictions to system resources are performed on the basis of preset access control information and a terminal apparatus for the same.

2. Description of the Related Art

As represented by videoconference systems, conference systems that are used to implement electronic conferences by sending and receiving audio/video information through a plurality of conference terminal apparatuses placed at remote locations have been constructed.

In such systems, the following procedure has to be performed before starting a conference. First, a group of conference participants is defined, and conference participation rights are granted to them. The information on the conference participation rights is then set in a management server that controls the conference system. Accordingly, an administrator of the conference system invokes a control application in the management server to set the access control information beforehand. The access control information includes general information used for the access restrictions to the conference system resources, such as a group definition and an access right to shared files. When implementing the conference, the management server of the conference system performs access privilege management processing on the basis of an access control list that has been set in the above-described manner. More specifically, the management server determines whether or not a user of the conference system is authorized to participate in the conference, and to access the shared files on the basis of the access control list.

Access privilege management techniques (see, for example, Japanese Unexamined Patent Application Publication No. 2004-15507, paragraphs [0186] to [0190] and FIG. 26) have been proposed. In this example technique, group attribute certificates including group identification information are issued to each group of specific users with electronic signatures. Also, each group is associated with service providing conditions. When a user requests to access a service, the group attribute certificates are obtained to confirm the user's access privileges. Only the authorized users or groups can access the requested service.

SUMMARY OF THE INVENTION

However, in a conference system according to the related art, it is difficult to dynamically modify access privilege settings during a conference.

More specifically, in the conference system according to the related art, an access control list including defined access privileges to system resources (e.g., a conference participation right, an access right to shared files) has to be set before starting the conference. Information on participants of the conference is also set in advance through a cumbersome procedure including steps such as defining groups and generating permission information. Thus, once the conference is started, it is difficult to modify the access privilege settings during the conference.

Generally, in a conference, it is often the case that participation of people who have not been registered as being among the conference participants is desired as the conference progresses. However, in such a case, it is not easy to dynamically modify the access privilege settings, since the conference system according to the related art presupposes that the access privileges are set beforehand. When participation of people who have not been registered as being among the conference participants is strongly desired, it is necessary to ask an administrator of the conference system to invoke a control application to modify the access privilege settings in a management server. In some cases, this results in a temporary adjournment of the conference.

Additionally, a procedure for creating, modifying, and deleting groups such as addition of group members is cumbersome, which thus undesirably burdens the administrator.

In view of the foregoing disadvantages, the present invention is made, and it is desirable to provide a conference system and a terminal apparatus capable of dynamically modifying the access privilege settings to the system resources.

To this end, according to an embodiment of the present invention, provided is a conference system in which communication data including audio information generated at a conference is exchanged between terminal apparatuses as well as access restrictions to system resources are performed on the basis of preset access control information. The conference system according to an embodiment of the present invention includes a plurality of terminal apparatuses and a conference management apparatus. The terminal apparatus has access privilege granting means, permission information storage means, and access privilege setting means, and performs processing on access privilege settings. The conference management apparatus has access control information updating means and access restriction management means, and manages the access restriction to the system resources. The system resources correspond to all of the available elements of the conference system.

When access privileges to the system resources are set for a target to which access rights are to be granted, the access privilege granting means generates permission information according to the set access privileges, and sends the permission information to the target. The access rights to system resources includes a conference participation right, an apparatus control right, and an access right to shared files. Also, the target to which the access rights are granted corresponds to a terminal apparatus used by another user to access the conference system. The permission information storage means stores the permission information that is set for the own terminal apparatus. The access privilege setting means obtains the permission information from the other terminal apparatus so as to cause the permission information to be stored in the permission information storage means. The access privilege setting means also sends the permission information to the conference management apparatus that manages the access restriction to the system resources, when necessary, so as to enable the access privilege. The access control information updating means of the conference management apparatus, upon receiving the permission information from the terminal apparatus, updates the access control information according to the permission information. The access restriction management means performs the access restrictions to the system resources on the basis of the access control information updated by the access control information updating means.

In such a conference system, a user (e.g., an administrator) sets the access privileges for a user of another terminal apparatus (i.e., target terminal apparatus) using their own terminal apparatus. The access privilege granting means of the terminal apparatus used by the administrator, upon receiving the access privilege settings, generates the permission information according to the set access privileges. The access privilege granting means then sends the permission information to the target terminal apparatus. Upon receiving the permission information, the access privilege setting means of the target terminal apparatus causes the permission information to be in the permission information storage means. The access privilege setting means of the target terminal apparatus then sends the permission information to the conference management apparatus, when necessary, to enable the access privileges in the conference system, in other words, to make the contents of the permission information be reflected in the access control information utilized by the other apparatuses in the conference system. Upon receiving the permission information from the target terminal apparatus, the access control information updating means of the conference management apparatus updates the access control information according to the contents of the permission information. The access restriction management means performs the access restriction to the system resources on the basis of the access control information updated by the access control information updating means. This allows the access control information to be updated using the terminal apparatus even when the conference system is operating.

To address the above-described disadvantages, according to another embodiment of the present invention, provided is a terminal apparatus that exchange communication data with other terminal apparatuses constituting a conference system in which access restrictions to system resources are performed on the basis of preset access control information such that instructions are given includes instruction inputting means to which user's instructions are input, communication controlling means that controls communication between the terminal apparatus and the other terminal apparatuses, access privilege granting means that, when predetermined access privileges to the available system resources including a conference participation right are set through the instruction inputting means for a target to which access rights are to be granted, generates permission information according to the set access privileges, and sends the permission information to the target through the communication controlling means, permission information storage means that stores the permission information, and access privilege setting means that, upon obtaining the permission information from the other terminal apparatuses through the communication controlling means, causes the obtained permission information to be stored in the permission information storage means as well as sends the permission information to a conference management apparatus that manages access restriction to the system resources, if necessary, so as to enable the access privilege.

In such a terminal apparatus, upon receiving the instructions concerning the access privileges to the system resources of the other terminal apparatus (i.e., target terminal apparatus) from a user, the instruction inputting means supplies the information on the access privilege settings to the access privilege granting means. The access privilege granting means generates the permission information according to the set access privileges, and sends the permission information to the target terminal apparatus through the communication controlling means. Upon obtaining the permission information through the communication controlling means, the access privilege setting means of the target terminal apparatus causes the permission information to be stored in the permission information storage means. The access privilege setting means of the target terminal apparatus then sends the permission information to the conference management apparatus that manages the access restriction to the system resources, when necessary, so as to enable the contents of the permission information. Thereafter, the conference management apparatus performs the access restriction management on the basis of the contents of the permission information.

In the conference system according to the embodiment of the present invention, the following procedure is performed. An administrator newly sets or modifies access privileges to system resources for other terminal apparatus using their own terminal apparatus. The permission information corresponding to the set access privileges is generated and sent to the other terminal apparatus (i.e., target terminal apparatus) whose access privileges have to be modified. Upon obtaining the permission information, the target terminal apparatus sends the permission information to a conference management apparatus when necessary. The conference management apparatus then updates access control information according to the received permission information. As described above, a request for modifying the access control information is generated by the terminal apparatus, and the access control information, which is referred to when performing access restrictions to the system resources, is updated according to the request. This allows the access privilege settings to be modified dynamically without the necessity to run a control application to modify the access privileges even when the conference system is operating.

BRIEF DESCRIPTION OF THE DRAWINGS

FIG. 5 shows an exemplary record structure of permission information utilized in an embodiment of the present invention;

FIG. 6 shows a communication data flow when messages are utilized in an embodiment of the present invention; and FIG. 7 is a sequence diagram showing a data flow between apparatuses in a conference system according to an embodiment of the present invention.

DESCRIPTION OF THE PREFERRED EMBODIMENTS

Figure 1:
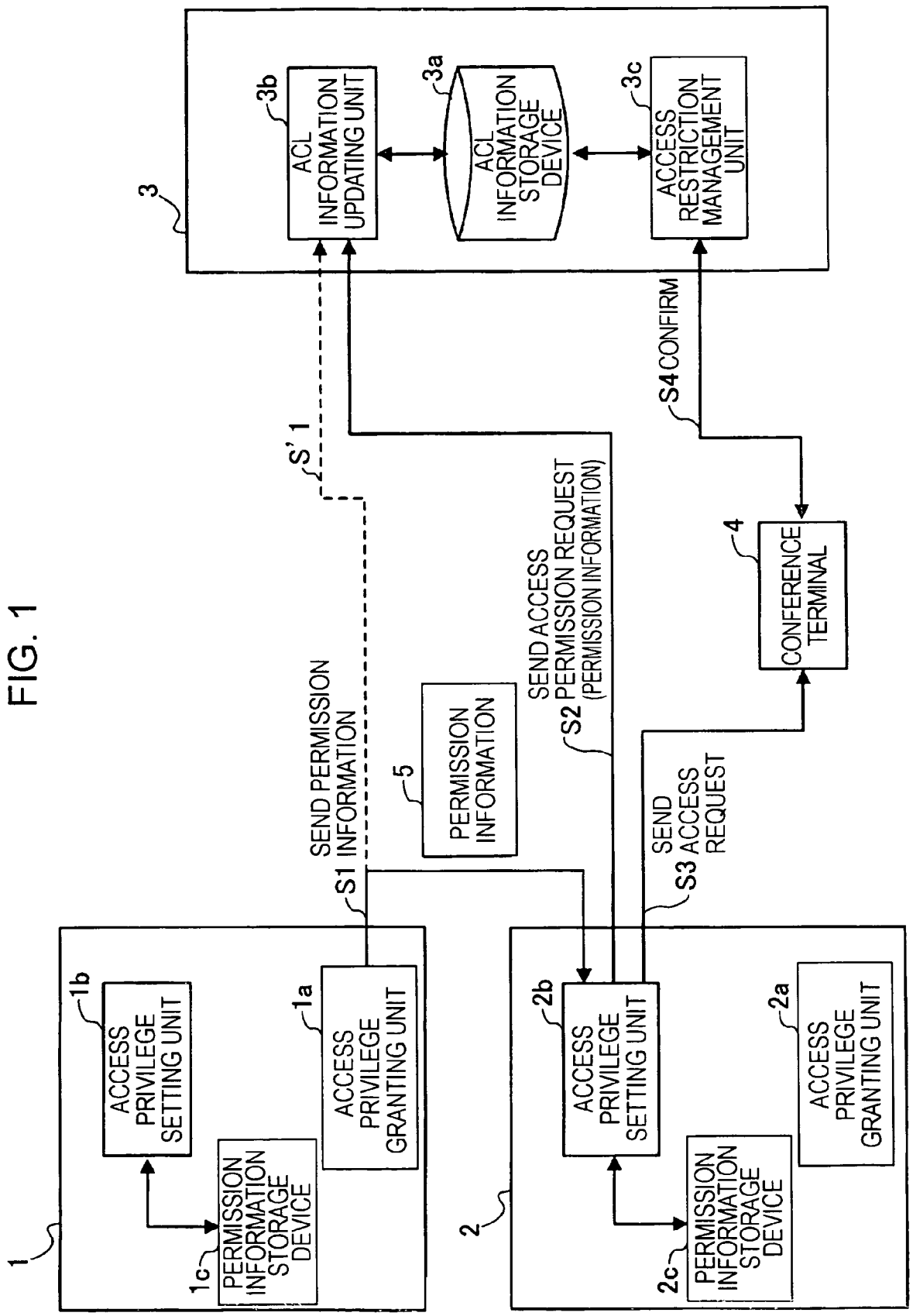
FIG. 1 is a conceptual diagram showing embodiments of the present invention.

Embodiments of the present invention will be described below with reference to the accompanying drawings. First, the concept of embodiments of the present invention will be described, and then, the specific details of the embodiments will be described. FIG. 1 is a conceptual diagram showing embodiments of the present invention.

A conference system according to an embodiment of the present invention includes a controller A (1), a controller B (2), a conference management apparatus 3, and a conference terminal 4 that are connected to each other through a communication interface (not shown).

The controller A (1) (i.e., a terminal apparatus) is connected to the other apparatuses in the conference system through a predetermined communication interface (not shown). The controller A (1) performs various settings for the conference terminal 4 so as to control operations of the conference terminal 4. Also, the controller A (1) includes an access privilege granting unit 1a, an access privilege setting unit 1b, and a permission information storage device 1c, and is capable of setting the access privileges to system resources for users. The controller A (1) can be configured to communicate with the other apparatuses through a wireless communication interface so as to be portable. Also, the controller A (1) can be configured to be a dedicated terminal apparatus that is connected to a predetermined conference terminal 4 with or without a cable. The controller B (2) (i.e., terminal apparatus) has the same configuration as the controller A (1). More specifically, the controller B (2) includes an access privilege granting unit 2a, an access privilege setting unit 2b, and a permission information storage device 2c.

When an administrator sets access privileges to system resources for another controller, used by another user, to which access rights are to be granted, the access privilege granting units 1a and 2a generates permission information 5 according to the set access privileges. The access privileges to system resource includes a conference participation right, an apparatus control right, and an access right to shared files. A privilege for modifying the access privilege settings of the other controllers is also included in the access privileges to the system resources, although this privilege does not directly utilize the system resources. The controller not having the privilege for modifying the access privilege settings of the other controllers does not generate the permission information 5. The permission information 5 may include complete information concerning the access privileges or only difference information between before and after the modification. The generated permission information 5 is sent to a target controller to which the access privileges are granted. More specifically, the permission information 5 may be sent to the target controller directly or through the conference management apparatus 3 or the conference terminal 4. When the conference system is incapable of attaching a certificate to the permission information 5, the permission information 5 may be sent directly to the conference management apparatus 3 instead of the target controller.

Upon obtaining the permission information 5 from the other controller, the access privilege setting units 1b and 2b cause the permission information 5 to be stored in the permission information storage devices 1c and 2c, respectively. If necessary, the access privilege setting units 1b and 2b then send the permission information 5 to the conference management apparatus 3 that manages the access restrictions to the system resources so as to enable the access privileges. The entire permission information may be sent to the conference management apparatus 3 at one time, such as when the user want to participate in the conference. Alternatively, only a necessary part of the permission information 5 concerning changed access privileges may be sent to the conference management apparatus 3 separately.

The permission information storage devices 1c and 2c are memory devices for storing the permission information 5.

The conference management apparatus 3 stores access control list (ACL) information, i.e., access control information, in which the system resource access privileges of each apparatus are listed. Also, the conference management apparatus 3 manages the access restrictions to the system resources on the basis of the ACL information. More specifically, the conference management apparatus 3 includes an ACL information storage device 3a, an ACL information updating unit 3b, and an access restriction management unit 3c.

The ACL information storage device 3a stores the ACL information created by a predetermined control application. The ACL information updating unit 3b updates this ACL information when necessary.

Upon obtaining the permission information 5 from the controller A (1) and controller B (2), the ACL information updating unit 3b updates the ACL information stored in the ACL information storage device 3a according to the obtained permission information 5.

The access restriction management unit 3c performs the access restrictions to the system resources on the basis of the ACL information stored in the ACL information storage device 3a. For example, the upon receiving a query request of the access privilege of a controller from the conference terminal 4, the access restriction management unit 3c determines whether or not the controller has the access privilege referring to the ACL information, and notifies the conference terminal 4 of the query result.

The conference terminal 4 captures audio/video information generated at the conference so as to send the audio/video information as communication data. The conference terminal 4 also receives and plays back the audio/video information obtained from other conference terminal 4. Accordingly, a conference between remote locations is implemented. The conference terminal 4 is connected to the controller A (1) and the controller B (2) via a predetermined wireless communication protocol so as to receive system resource access instructions, such as an apparatus control instruction and a file transfer instruction. Upon receiving the instruction, the conference terminal 4 queries the conference management apparatus 3 as to whether or not the controller is permitted to perform the instructed operation. If the controller has the permission, the conference terminal 4 executes the instructed operation. The conference system may be configured such that the conference terminal 4 stores the ACL information, and manages the access restriction on the basis of this ACL information.

Operations of the conference system having the foregoing configuration will be now described. In the following description, the controller A (1) generates permission information, and the controller B (2) utilizes the permission information. For ease of explanation, it is assumed that the controllers are associated with individual users. Thus, if the user has access rights, the controller used by the user also has the access privileges. The conference system can be configured such that the controller is shared among multiple users, and the individual users are identified during login processing.

Suppose that the controller A (1) has a right for modifying access privileges of the other controllers, and the controller B (2) currently does not have access rights, such as a conference participation right. An administrator of the controller A (1) operates the controller A (1) to set the access privilege for the controller B, upon receiving a request from a user of the controller B (2). It is more preferable that a user list displayed on a screen or the like at this time is configured to be dynamically reorganizable with respect to keys, such as "people now participating in conference" and "group to which user belongs". The access privilege granting unit 1a of the controller A (1) generates the permission information 5 according to the set access privileges, and then sends the permission information 5 to the controller B (2) (at STEP S1).

Upon obtaining the permission information 5, the access privilege setting unit 2b of the controller B (2) stores the obtained permission information 5 in the permission information storage device 2c. If the permission information 5 only contains the difference information between access privilege settings before and after the modification, the access privilege setting unit 2b sets the latest complete permission information according to the difference information. When necessary (e.g., when the user wants to participate in the conference, when the user wants to access the shared files, etc.), the access privilege setting unit 2b sends an access permission request to the conference management apparatus 3 together with the permission information 5 (at STEP S2).

Upon receiving the permission information (i.e., access permission request), the ACL information updating unit 3b of the conference management apparatus 3 updates the ACL information of the controller B (2) according to the permission information, and stores the updated ACL information in the ACL information storage device 3a.

The foregoing procedure allows the ACL information to be modified dynamically. There may be occasions where the conference system is incapable of preventing the permission information from being forged by the controller B (2), for example, the conference system is incapable of attaching certificates to the permission information 5. In such cases, instead of the foregoing STEPs S1 and S2, the permission information 5 may be directly sent to the conference management apparatus 3 from the controller A (1) (at STEP S'1).

After updating the ACL information, the controller B (2) sends an access request, such as a conference participation request, to the conference terminal 4 (at STEP S3). The conference terminal 4 then queries the conference management apparatus 3 as to whether or not the controller B (2) is authorized to perform the requested access (at STEP S4). If the controller B (2) is authorized, the conference terminal 4 accepts the access request, and executes the requested access processing. If not, the conference terminal denies the access request.

The foregoing procedure enables the access restriction management using the dynamically modified ACL information.

Accordingly, since the access privileges are modified using the controllers, the access privilege setting application stored in the conference management apparatus 3 is not necessarily activated to modify the access privileges. This allows the dynamic updating of the ACL information having the access privileges listed even during the conference. As a result, the access privileges to the system resources can be modified dynamically and more easily.

Figure 2:
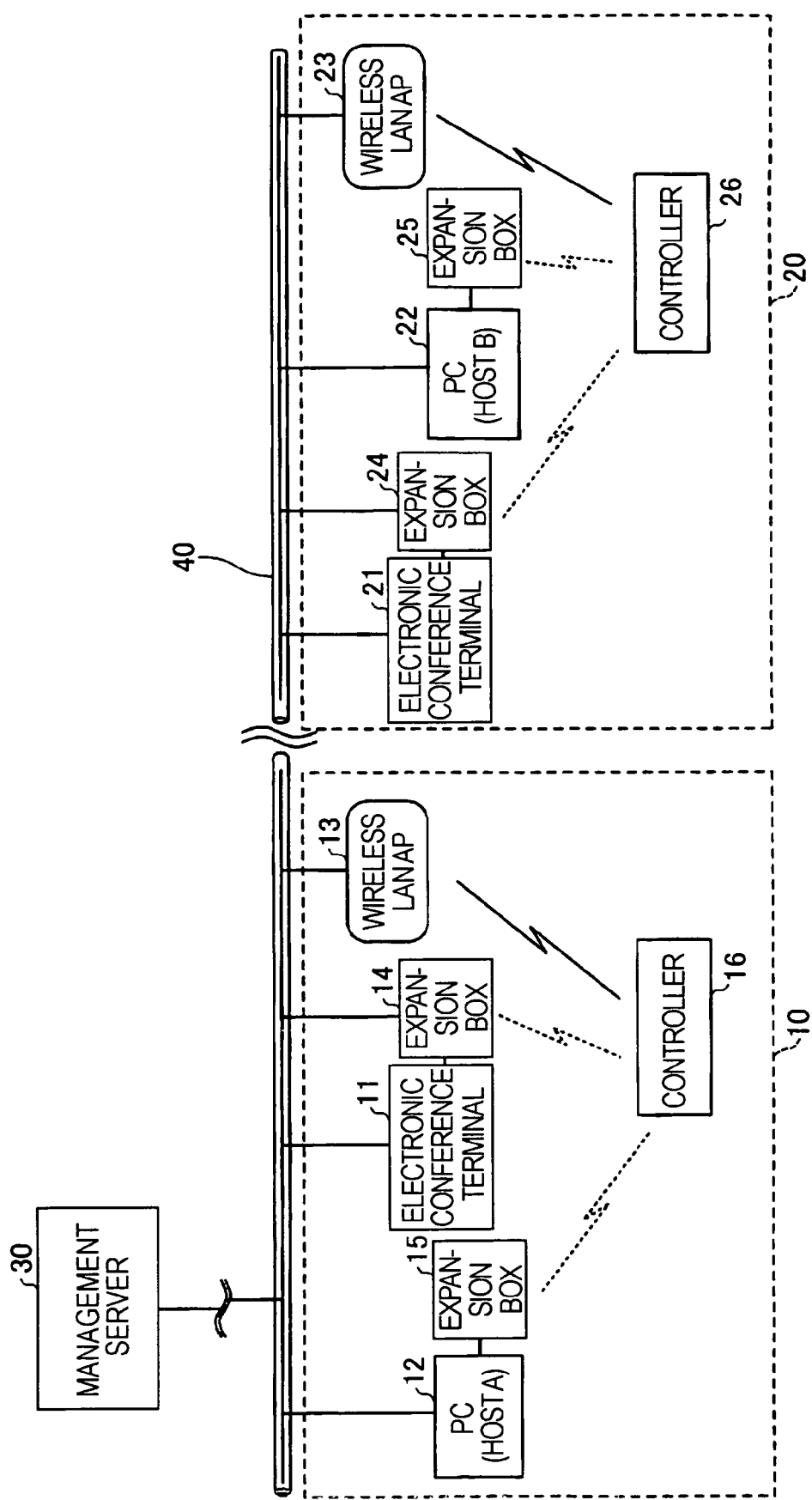
FIG. 2 shows a configuration of a videoconference system according to an embodiment of the present invention.

An example in which an embodiment of the present invention is applied to a videoconference system is described in detail below with reference to the drawings. FIG. 2 shows a configuration of a videoconference system according to an embodiment of the present invention.

In the videoconference system according to the embodiment of the present invention, electronic conference terminals (hereinafter referred to as "conference terminals") 11 and 21, controllers 16 and 26, and PCs (personal computers) 12 and 22 are connected to a management server 30 through an Internet Protocol network (hereinafter, referred to as "IP network") 40. The electrical conference terminals 11 and 21 correspond to conference terminals, the PCs 12 and 22 correspond to file terminals, and the management server 30 corresponds to the conference management apparatus. The conference terminal 11 and the PC 12 are placed in a conference room A (10), whereas the conference terminal 21 and the PC 22 are placed in a conference room B (20).

Expansion boxes 14 and 24, connected to the conference terminals 11 and 21, respectively, are used for adapting the known conference system to the conference system according to the embodiment of the present invention. More specifically, the expansion boxes 14 and 24 control short-range communication between the conference terminals 11 and 21 and the controllers 16 and 26 to control operations of the conference terminals 11 and 21, respectively. Likewise, expansion boxes 15 and 25, connected to the PCs 12 and 22, control short-range communication between the PCs 12 and 22 and the controllers 16 and 26 to control the operations of the PCs 12 and 22, respectively. The expansion boxes 14 and 15 and the conference terminals 11 and 21 as well as the expansion boxes 24 and 25 and the PCs 12 and 22, respectively, may be configured as all-in-one apparatuses.

Additionally, wireless LAN (local area network) APs (access points) 13 and 23 allows the controllers 16 and 26 to directly communicate with other apparatuses through the IP network 40.

Accordingly, the controllers 16 and 26 are connected to the conference terminals 11 and 21 through the expansion boxes 14 and 24, and to PCs 12 and 22 through the expansion boxes 15 and 25, respectively. The controllers 16 and 26 are also connected to the management server 30, conference terminals 11 and 21, and PCs 12 and 22 through the wireless LAN APs 13 and 23 and the IP network 40, respectively.

Figure 3:
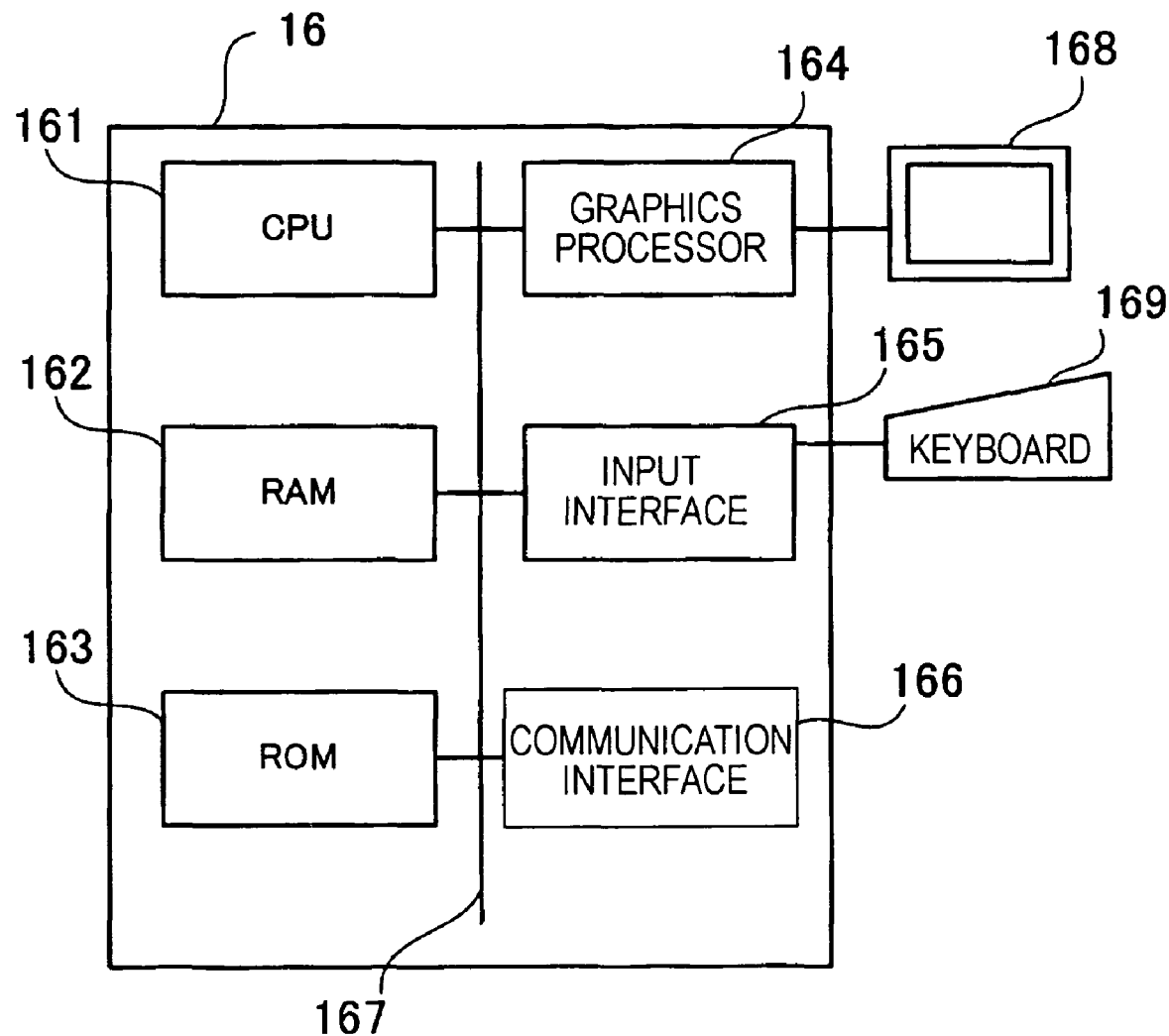
FIG. 3 is a block diagram showing an exemplary hardware configuration of a controller utilized in an embodiment of the present invention.

Now, a hardware configuration of the controller 16 will be described. FIG. 3 is a block diagram showing an exemplary hardware configuration of a controller utilized in the embodiment of the present invention.

A CPU (central processing unit) 161 controls operations of the entire controller 16. The CPU 161 is connected to a RAM (random access memory) 162, a ROM (read only memory) 163, a graphics processor 164, an input interface 165, and a communication interface 166 through a bus 167.

The RAM 162 temporarily stores at least part of OS (operating system) programs and application programs executed by the CPU 161. The RAM 162 also stores various data necessary for the CPU 161 to execute the processing. The ROM 163 stores the OS and application programs. The programs may be downloaded from the management server 30 through the communication interface 166, when necessary, and stored in the RAM 162. The graphics processor 164, to which a display unit 168 is connected, causes images to be displayed on a screen of the display unit 168 according to instructions of the CPU 161. An input interface 165, to which a keyboard 169 is connected, sends a signal received from the keyboard 169 to the CPU 161 through the bus 167. The communication interface 166 sends and receives data between the controller and the other apparatuses through the wireless communication network. The display unit 168 and the keyboard 169 can be integrated with the controller 16 to form an all-in-one apparatus, just like a handheld computer or a cell phone device. Furthermore, an audio input/output unit and an image-capturing unit may be included in the controller 16, if necessary.

The foregoing hardware configuration can implement the processing functions of the embodiment of the present invention. Although the hardware configuration of the controllers is shown in FIG. 3, the same hardware configuration can be applied to the conference terminals and the management server.

Accordingly, each apparatus constituting the conference system according to the embodiment of the present invention has the hardware configuration described above, and the CPU of each apparatus executes the programs, thereby implementing the processing functions of the conference system.

Figure 4:
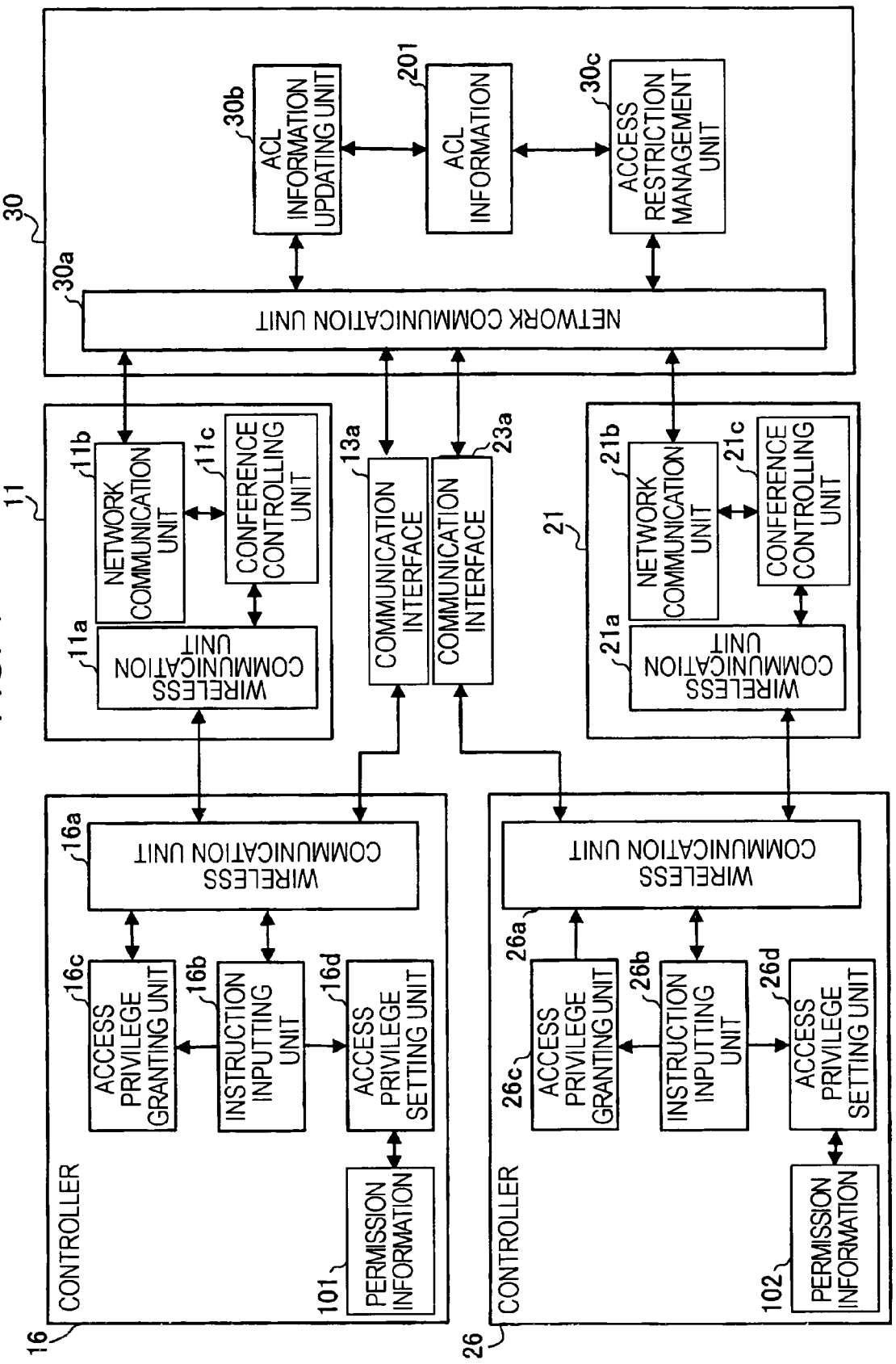
FIG. 4 is a functional block diagram of an exemplary software configuration of a videoconference system according to an embodiment of the present invention.

A software configuration of the conference system according to the embodiment will be described next. FIG. 4 is a functional block diagrams showing an exemplary software configuration of the videoconference system according to an embodiment of the present invention. Components shown in FIG. 2 are denoted by the same numerals. The conference terminal 11, the controller 16, and a communication interface 13a are placed in the conference room A, whereas the conference terminal 21, the controller 26, and a communication interface 23a are placed in the conference room B.

The controller 16 includes a wireless communication unit 16a, an instruction inputting unit 16b, an access privilege granting unit 16c, and an access privilege setting unit 16d. Likewise, the controller 26 includes a wireless communication unit 26a, an instruction inputting unit 26b, an access privilege granting unit 26c, and an access privilege setting unit 26d. The wireless communication unit 16a is connected to a wireless communication unit 11a of the conference terminal 11 and to the communication interface 13a. The wireless communication unit 16a sends communication data generated by the instruction inputting unit 16b, the access privilege granting unit 16c, and the access privilege setting unit 16d, and supplies the received communication data to each unit of the controller 16. The instruction inputting unit 16b receives access privilege setting information for users that is input using a keyboard. The instruction inputting unit 16b also notifies the conference terminal 11 of the access privilege setting information through the access privilege granting unit 16c, the access privilege setting unit 16d, and the wireless communication unit 16a. The access privilege granting unit 16c generates the permission information according to the access privileges of the target controllers, which is set through the instruction inputting unit 16b. The access privilege granting unit 16c also sends the generated permission information to the target controllers through the wireless communication unit 16a. The access privilege setting unit 16d sends the permission information 101, received from the other controller, to the management server 30 through the wireless communication unit 16a, if necessary, such that access privileges of the controller 16 are enabled. Since the controller 26 has the same configuration, the explanations for each unit of the controller 26 are omitted here.

The conference terminal 11 includes the wireless communication unit 11a, a network communication unit 11b, and a conference controlling unit 11c. Likewise, the conference terminal 21 includes a wireless communication unit 21a, a network communication unit 21b, and a conference controlling unit 21c. The wireless communication unit 21a controls wireless communication between the conference terminal 11 and the controller 16. The network communication unit 11b is connected to the management server 30 and the other conference terminal 21 through the network. The conference terminal 11 exchanges communication data, such as the audio/video information generated at the conference, with the other conference terminal 21 through the network communication unit 11b. The conference controlling unit 11c generates communication data from the audio/video signals captured by the conference terminal 11, and sends the communication data to the other conference terminal 21 through the network communication unit 11b. The conference controlling unit 11c also processes the audio/video information received from the other conference terminal 21 so as to control the audio/video signal output. Additionally, upon receiving an access instruction from the controller 16 through the wireless communication unit 11a, the conference controlling unit 11c queries the management server 30 as to whether or not the controller 16 is authorized to perform the requested access. If the controller 16 is authorized, the conference controlling unit 11c executes the requested access instruction. Since the conference terminal 21 has the same configuration as the conference terminal 11, the explanations for each unit of the conference terminal 21 are omitted here.

The management server 30 includes a network communication unit 30a, an ACL information updating unit 30b, and an access restriction management unit 30c. The network communication unit 30a receives communication data, such as the query request of the access privilege sent from the conference terminals 11 and 21, so as to supply the communication data to the access restriction management unit 30c. The network communication unit 30a also sends a response back to the source of the communication data. Additionally, the network communication unit 30a receives the permission information 101 and 102 sent from the controllers 16 and 26 through the communication interfaces 13a and 23a, respectively, so as to supply the permission information 101 and 102 to the ACL information updating unit 30b. The network communication unit 30a also sends a response from the ACL information updating unit 30b back to the corresponding controller. The ACL information updating unit 30b updates the ACL information 201 according to the permission information supplied through the network communication unit 30a. The access restriction management unit 30c manages the access restriction on the basis of the ACL information 201.

The communication interfaces 13a and 23a are wirelessly connected to the controllers 16 and 26, respectively. The communication interfaces 13a and 23a are also connected to the management server 30 and conference terminals 11 and 21 through the network. In other words, the communication interfaces 13a and 23a perform interface processing for the wireless communication and the network communication.

Now, operations of the conference system having the foregoing configuration will be described. In the following example, the controller 16 generates the permission information, and the controller 26 utilizes the permission information.

The access privilege granting unit 16c of the controller 16 is notified of the access privilege setting information of the controller 26 that is supplied through the instruction inputting unit 16b. The access privilege setting application is not necessarily prestored in the controller 16. A Java applet or the like stored in the management server 30 may be downloaded to the controller 16 through the conference terminal 11. Downloading the access privilege setting application as well as default settings for a conference held at the conference room and group information enables a dynamic modification of a menu, thereby providing the user an improved usability of the access privilege settings.

The permission information includes information on the access privileges to the system resources. The system resources correspond to elements constituting the videoconference system. More specifically, the access privileges to the system resources include a conference participation right, a control right of apparatuses constituting the conference system (e.g., a control right of a view direction of a camera), and an access right to files shared among the participants. Additionally, a right for modifying the ACL information, i.e., a permission information setting right, is also included in the access privileges to the system resources.

FIG. 5 shows an exemplary record structure of permission information utilized in the embodiment of the present invention.

The permission information includes a setting field 200c that indicates whether or not the access privilege is granted to a user for each item shown in an item field 200b of the corresponding type shown in a type field 200a. The access privileges to system resources shown in the type field 200a are classified with respect to the type of the system resources. In the example of FIG. 5, the types such as "access privileges for the conference", "access privileges for files shared by the conference group", "access privileges for files shared by group 1" are shown in the type field 200a. In the item field 200b, the access privilege items are shown for each system resource type. In FIG. 5, for example, the access privilege items such as "sending video", "receiving video", "sending audio", "receiving audio", and "inviting other participants" are provided for the type "access privileges for the conference". Likewise, the access privilege items such as "reading", "updating", and "adding files" are provided for the types "access privileges for files shared by the conference group" and "access privileges for files shared by group 1". The setting field 200c has information indicating whether the access privilege is granted (Y) or not (N) for each item.

For example, in FIG. 5, the access privileges for "sending video", "receiving video", "sending audio", and "receiving audio" of the type "access privileges for the conference" are granted to a user. However, the access privilege for "inviting the other participants" is not granted. In other words, the user of a controller having the foregoing settings is allowed to participate in the conference but not allowed to invite the other people to participate in the conference. Also, as to the access to the files shared by the conference group, the user is allowed to read the files but not allowed to update the files nor add new files.

The permission information can be sent in any manner depending on the conference system. More specifically, the permission information can be sent as flag information, messages that instruct the access to the system resources, or script files that directly control the server. When utilizing the flag information, the complete permission information or just the difference information between permission information before and after the modification may be sent.

The permission information is sent to the controller 26 through the wireless communication unit 16a and the communication interfaces 13a and 23a. Upon receiving the permission information, the controller 26 generates the permission information 102 according to the received permission information, and stores the generated permission information 102 in a memory device. The controller 26 then sends the permission information 102 to the management server 30, when necessary, to request the modification of the ACL information 201 stored in the management server 30.

At this time, the permission information can be sent in any manner as described above.

Now, a case in which the messages that instruct the access to the system resources are utilized will be described. FIG. 6 shows a communication data flow when messages are utilized in an embodiment of the present invention. More specifically, FIG. 6 shows a case in which a participant is newly added to a conference group. The components shown in FIG. 2 are denoted by the same numerals, thus the explanations of these components are omitted.

In this embodiment, instructions for accessing the system resources are sent and received as messages. Hereinafter, these messages are referred to as "tickets". Sending the instructions to a target apparatus as tickets makes it easier for the users to understand a process flow.

In the example shown in FIG. 6, the controller 16 first generates a ticket ("Invite") 301 for granting the conference participation right to the user of the controller 26. The ticket ("Invite") 301 is then sent to the controller 26 through the wireless LAN AP 13. Upon receiving the ticket ("Invite") 301, the controller 26 sends the ticket ("Invite") 301 to the management server 30 to enable the conference participation right, such that the user of the controller 26 is authorized to participate in the conference.

The foregoing procedure for sending the system resource access instructions utilizing messages is also applied to a procedure for sending data file exchange instructions. For example, when transferring a file stored in the PC (host A) 12 managed by the controller 16 to the PC (host B) 22 managed by the controller 26, the controller 16 first issues and sends the ticket 301 containing address information of the target file to the controller 26. Upon receiving the ticket 301, the controller 26 sends the received ticket 301 to the PC (host B) 22. The file data is transferred, for example, between the PC (host A) 12 and the PC (host B) 22 using the information included in the ticket 301.

As described above, transmitting the access instructions to the various system resources by a common procedure simplifies implementation of the conference system, thus producing a secondary effect.

A process flow between apparatuses constituting the conference system is described in detail next taking a case where the controller 16 grants the conference participation right to the controller 26 for example. FIG. 7 is a sequence diagram showing a data flow between the apparatuses according to an embodiment of the present invention.

[At STEP S10] The controller 16 first obtains address information of the controller 26. More specifically, the controller 16 sends a query command for the address information of the controller 26 to the management server 30 (at STEP S10a). The management server 30 sends back a response including the address information of the controller 26 to the controller 16 (at STEP S10b).

The foregoing steps allow the controller 16 to obtain the address information of the controller 26 to which the conference participation right is granted.

Then, the controller 16 sends a ticket for granting the conference participation right to the controller 26.

[At STEP S11] More specifically, the controller 16 sends a call request to the controller 26 (at STEP S11a) in order to establish a connection with the controller 26. Then, the controller 26 sends back a response to the controller 16 (at STEP S11b).

[At STEP S12] After generating a ticket (i.e., a command) for modifying the ACL information, the controller 16 sends the ticket to the controller 26 so as to allow the controller 26 to participate in the conference.

The foregoing steps allow the ticket for granting the conference participation right to be sent to the controller 26 from the controller 16.

The ACL information stored in the management server 30 is updated next.

[At STEP S13] Upon receiving the ticket sent from the controller 16, the controller 26 stores the ticket in a memory area. The controller 26 then sends an ACL information modification request to the management server 30 (at STEP S13a), if necessary. The permission information listed in the tickets includes all of the access rights available to the controller 26. The ACL information modification request is made for one or more out of all the access rights. Upon receiving the modification request, the management server 30 confirms a validity of the modification request using an electronic certification or the like, when necessary. After confirming the validity, the management server 30 updates the ACL information, and then sends back a response to the controller 26 (at STEP S13b).

The foregoing steps allow the ACL information stored in the management server 30 to be updated in response to the modification request from the controller 26. Before sending the ACL information modification request, the controller 26 may query the management server 30 as to the ACL information currently set in the management server 30.

The controller 26 is then connected to the conference terminal 21 such that the user of the controller 26 can participate in the conference.

[At STEP S14] The controller 26 sends a call request for participating in the conference to the conference terminal 21 (at STEP S14a). Upon receiving the call request, the conference terminal 21 queries the management server 30 as to whether or not the request can be accepted (at STEP S14b). The conference terminal 21 then receives the query result on the presence or absence of the permission (at STEP S14c). On the basis of this query result, the conference terminal 21 determines whether or not the controller 26 is permitted to participate in the conference, and sends back the result to the controller 26 (at STEP S14d). If the conference participation request is accepted, the conference terminal 21 notifies the controller 26 of establishment of a conference connection, thereby completing a connection procedure (at STEP S14e).

Performing the foregoing procedure allows the user of the controller 26 to participate in the conference through the conference terminal 21.

The controller 16 may be configured to send the ACL information modification request to the management server 30 between the steps S12 and S13a. In this case, the processing performed at STEP S13 can be eliminated, thus the processing at STEP S14 is performed right after sending modification request. Each system resource can be configured to have the ACL information concerning itself. In such a case, in order to modify the ACL information, the processing at STEPs S11 to S13 is performed for each system resource.

It should be understood by those skilled in the art that various modifications, combinations, sub-combinations and alterations may occur depending on design requirements and other factors insofar as they are within the scope of the appended claims or the equivalents thereof.

What is claimed is:

1. A conference system in which communication data including audio information generated at a conference is exchanged between terminal apparatuses as well as access restrictions to system resources are performed on the basis of preset access control information, the conference system comprising:

a plurality of terminal apparatuses; and
a conference management apparatus,
wherein each terminal apparatus has
access privilege granting means that, when predetermined access privileges to available system resources including a conference participation right are set for a target terminal apparatus to which access rights are to be granted, generates permission information according to the set access privileges, and sends the permission information to the target terminal apparatus,
permission information storage means that stores the permission information, and
access privilege setting means that obtains the permission information so as to cause the permission information to be stored in the permission information storage means as well as sends the permission information to the conference management apparatus that manages access restriction to the system resources so as to enable the access privilege,
the target terminal apparatus has access privilege setting means that transmits the permission information received from another terminal apparatus to the conference management apparatus, and
wherein the conference management apparatus has
access control information updating means that, upon receiving the permission information from the target terminal apparatus, updates the access control information according to the permission information, and
access restriction management means that performs the access restrictions to the system resources on the basis of the access control information updated by the access control information updating means.

2. A conference system in which communication data including audio information generated at a conference is exchanged between terminal apparatuses as well as access restrictions to system resources are performed on the basis of preset access control information, the conference system comprising:

a plurality of terminal apparatuses; and
a conference management apparatus,
wherein the terminal apparatus has
access privilege granting means that, when predetermined access privileges to available system resources including a conference participation right are set for a target to which access rights are to be granted, generates permission information according to the set access privileges, and sends the permission information to the target,
permission information storage means that stores the permission information, and
access privilege setting means that obtains the permission information so as to cause the permission information to be stored in the permission information storage means as well as sends the permission information to the conference management apparatus that manages access restriction to the system resources so as to enable the access privilege, and
wherein the conference management apparatus has
access control information updating means that, upon receiving the permission information from the terminal apparatus, updates the access control information according to the permission information, and
access restriction management means that performs the access restrictions to the system resources on the basis of the access control information updated by the access control information updating means,
and the predetermined access privileges to the system resources include a modification privilege of the access privilege settings, and wherein the access privilege granting means of the terminal apparatus, upon receiving a modification request of the access privilege, determines whether or not the modification privilege of the access privilege settings is granted to its own terminal apparatus on the basis of the permission information stored in the permission information storage means of its own terminal apparatus, and modifies the access privilege settings only when the modification privilege is granted.

3. The conference system according to claim 1, wherein the access privilege setting means of the terminal apparatus sends the entire permission information stored in the permission information storage means or the relevant part of the permission information concerning the access privileges to be enabled to the conference management apparatus according to circumstances.

4. The conference system according to claim 1, wherein the access privilege granting means and the access privilege setting means of the terminal apparatus set only difference information between the access privileges newly set and the access privileges set before the modification as necessary.

5. A conference system in which communication data including audio information generated at a conference is exchanged between terminal apparatuses as well as access restrictions to system resources are performed on the basis of preset access control information, the conference system comprising:

a plurality of terminal apparatuses; and
a conference management apparatus,
wherein the terminal apparatus has
access privilege granting means that, when predetermined access privileges to available system resources including a conference participation right are set for a target to which access rights are to be granted, generates permission information according to the set access privileges, and sends the permission information to the target,
permission information storage means that stores the permission information, and
access privilege setting means that obtains the permission information so as to cause the permission information to be stored in the permission information storage means as well as sends the permission information to the conference management apparatus that manages access restriction to the system resources so as to enable the access privilege, and
wherein the conference management apparatus has
access control information updating means that, upon receiving the permission information from the terminal apparatus, updates the access control information according to the permission information, and
access restriction management means that performs the access restrictions to the system resources on the basis of the access control information updated by the access control information updating means,
and when collaborative processing is performed between apparatuses that are connected to the plurality of terminal apparatuses in the conference system, instruction information including information necessary for performing the collaborative processing between the terminal apparatuses is exchanged as a ticket in a predetermined format, and wherein the access privilege granting means of the terminal apparatus sends the ticket with the permission information set therein to the target to which the access rights are to be granted.

6. A terminal apparatus that exchanges communication data with terminal apparatuses constituting a conference system in which access restrictions to system resources are performed on the basis of preset access control information such that instructions are given, the terminal apparatus comprising:

instruction inputting means to which user's instructions are input;
communication controlling means that controls communication between the terminal apparatus and other apparatuses;
access privilege granting means that, when predetermined access privileges to available system resources including a conference participation right are set through the instruction inputting means for a target to which access rights are to be granted, generates permission information according to the set access privileges, and sends the permission information to the target through the communication controlling means;
permission information storage means that stores the permission information; and
access privilege setting means that, upon obtaining the permission information from the other terminal apparatuses through the communication controlling means, causes the obtained permission information to be stored in the permission information storage means as well as sends the permission information to a conference management apparatus that manages access restrictions to the system resources, if necessary, so as to enable the access privilege,
wherein the predetermined access privileges to the system resources include a modification privilege of the access privilege settings, and wherein the access privilege granting means of the terminal apparatus, upon receiving a modification request of the access privilege, determines whether or not the modification privilege of the access privilege settings is granted to its own terminal apparatus on the basis of the permission information stored in the permission information storage means of its own terminal apparatus, and modifies the access privilege settings only when the modification privilege is granted.

7. A conference system in which communication data including audio information generated at a conference is exchanged between terminal apparatuses as well as access restrictions to system resources are performed on the basis of preset access control information, the conference system comprising:

a plurality of terminal apparatuses; and
a conference management apparatus,
wherein each terminal apparatus has
an access privilege granting unit that, when predetermined access privileges to available system resources including a conference participation right are set for a target terminal apparatus to which access rights are to be granted, generates permission information according to the set access privileges, and sends the permission information to the target terminal apparatus,
a permission information storage device that stores the permission information, and
an access privilege setting unit that obtains the permission information so as to cause the permission information to be stored in the permission information storage device as well as sends the permission information to the conference management apparatus that manages access restriction to the system resources so as to enable the access privilege,
the target terminal apparatus has an access privilege setting unit that transmits the permission information received from another terminal apparatus to the conference management apparatus, and
wherein the conference management apparatus has
an access control information updating unit that, upon receiving the permission information from the target terminal apparatus, updates the access control information according to the permission information, and
an access restriction management unit that performs the access restrictions to the system resources on the basis of the access control information updated by the access control information updating unit.

8. A terminal apparatus that exchanges communication data with terminal apparatuses constituting a conference system in which access restrictions to system resources are performed on the basis of preset access control information such that instructions are given, the terminal apparatus comprising:

an instruction inputting unit to which user's instructions are input;

a communication controlling unit that controls communication between the terminal apparatus and other apparatuses;

an access privilege granting unit that, when predetermined access privileges to available system resources including a conference participation right are set through the instruction inputting unit for a target to which access rights are to be granted, generates permission information according to the set access privileges, and sends the permission information to the target through the communication controlling unit;

a permission information storage device that stores the permission information; and an access privilege setting unit that, upon obtaining the permission information from the other terminal apparatuses through the communication controlling unit, causes the obtained permission information to be stored in the permission information storage device as well as sends the permission information to a conference management apparatus that manages access restrictions to the system resources, if necessary, so as to enable the access privilege, wherein the predetermined access privileges to the system resources include a modification privilege of the access privilege settings, and wherein the access privilege granting unit of the terminal apparatus, upon receiving a modification request of the access privilege, determines whether or not the modification privilege of the access privilege settings is granted to its own terminal apparatus on the basis of the permission information stored in the permission information storage device of its own terminal apparatus, and modifies the access privilege settings only when the modification privilege is granted.

\* \* \* \* \*